United States Patent
Takahara et al.

(10) Patent No.: US 10,143,134 B2
(45) Date of Patent: Dec. 4, 2018

(54) AGRICULTURAL WORK MACHINE, AGRICULTURAL WORK MANAGEMENT METHOD, AGRICULTURAL WORK MANAGEMENT PROGRAM, AND RECORDING MEDIUM WITH THE AGRICULTURAL WORK MANAGEMENT PROGRAM RECORDED THEREON

(71) Applicant: Kubota Corporation, Osaka-shi (JP)

(72) Inventors: Kazuhiro Takahara, Sakai (JP); Katsuhide Kato, Sakai (JP)

(73) Assignee: Kubota Corporation, Osaka (JP)

( * ) Notice: Subject to any disclaimer, the term of this patent is extended or adjusted under 35 U.S.C. 154(b) by 278 days.

(21) Appl. No.: 14/779,386

(22) PCT Filed: Sep. 9, 2013

(86) PCT No.: PCT/JP2013/074254
§ 371 (c)(1),
(2) Date: Sep. 23, 2015

(87) PCT Pub. No.: WO2014/155771
PCT Pub. Date: Oct. 2, 2014

(65) Prior Publication Data
US 2016/0057929 A1    Mar. 3, 2016

(30) Foreign Application Priority Data

Mar. 26, 2013 (JP) ................................ 2013-064835

(51) Int. Cl.
*A01D 41/127* (2006.01)
*A01D 41/133* (2006.01)
(Continued)

(52) U.S. Cl.
CPC ....... *A01D 41/1275* (2013.01); *A01D 41/127* (2013.01); *A01D 41/1208* (2013.01); *A01D 41/133* (2013.01); *G06Q 50/02* (2013.01)

(58) Field of Classification Search
CPC ............ A01D 41/1275; A01D 41/1208; A01D 41/127; A01D 41/133; G06Q 50/02
(Continued)

(56) References Cited

U.S. PATENT DOCUMENTS

| 5,712,782 A | 1/1998 | Weigelt et al. |
| 2009/0000263 A1* | 1/2009 | Gossop ................. A01D 41/00 56/432 |

(Continued)

FOREIGN PATENT DOCUMENTS

| CN | 102414713 A | 4/2012 |
| CN | 102668899 A | 9/2012 |

(Continued)

OTHER PUBLICATIONS

Chau, et al., Research on impulse grain flow sensor, Shanghai Jiaotong University, School of Mechanical and Power Engineering, 2009.

*Primary Examiner* — Muhammad Shafi
(74) *Attorney, Agent, or Firm* — The Webb Law Firm

(57) ABSTRACT

An agricultural crop harvester (1) includes a tank in which harvested crops are stored, a stored amount calculation section (51) that calculates a current stored amount of harvested crops stored in the tank, a communication section (61) which receives drier operation information indicative of a drier operational status transmitted from a drying facility 7, a work management section 62 that determines completion timing of a harvesting work based on the current stored amount and the drier operation information, and a notification section 63 which notifies the completion timing.

10 Claims, 7 Drawing Sheets

(51) Int. Cl.
*A01D 41/12* (2006.01)
*G06Q 50/02* (2012.01)

(58) Field of Classification Search
USPC .......................................................... 701/50
See application file for complete search history.

(56) References Cited

U.S. PATENT DOCUMENTS

| | | | | |
|---|---|---|---|---|
| 2009/0019826 | A1* | 1/2009 | Rigney | A01D 41/00 56/13.5 |
| 2010/0145572 | A1* | 6/2010 | Steckel | A01B 79/005 701/31.4 |
| 2010/0307120 | A1* | 12/2010 | Stover | A01D 46/08 56/28 |
| 2013/0046525 | A1* | 2/2013 | Ali | A01B 79/005 703/6 |

FOREIGN PATENT DOCUMENTS

| | | | |
|---|---|---|---|
| EP | 2353353 | A1 | 8/2011 |
| JP | 2002186348 | A | 7/2002 |
| JP | 2004326169 | A | 11/2004 |
| JP | 200634232 | A | 2/2006 |
| JP | 2006-094780 | * | 4/2006 |
| JP | 200694780 | A | 4/2006 |
| JP | 2006254725 | A | 9/2006 |
| JP | 2006254758 | A | 9/2006 |
| JP | 2008-228630 | * | 10/2008 |
| JP | 2008228630 | A | 10/2008 |
| JP | 200944995 | A | 3/2009 |
| JP | 2012175920 | A | 9/2012 |
| WO | 2010125236 | A1 | 11/2010 |

* cited by examiner

AGRICULTURAL WORK MACHINE, AGRICULTURAL WORK MANAGEMENT METHOD, AGRICULTURAL WORK MANAGEMENT PROGRAM, AND RECORDING MEDIUM WITH THE AGRICULTURAL WORK MANAGEMENT PROGRAM RECORDED THEREON

CROSS-REFERENCE TO RELATED APPLICATIONS

This application is the United States national phase of International Application No. PCT/JP2013/074254 filed Sep. 9, 2013, and claims priority to Japanese Patent Application No. 2013-064835 filed Mar. 26, 2013, the disclosures of which are hereby incorporated in their entirety by reference.

TECHNICAL FIELD OF THE INVENTION

The present disclosure relates to an agricultural crop harvester that harvests agricultural crops to be dried in a drying facility after being harvested, an agricultural work management method that manages an agricultural work through data communication with the agricultural crop harvester, an agricultural work management program and a recording medium recording this agricultural work management program.

BACKGROUND OF THE INVENTION

As examples of agricultural crops to be dried in a drying facility after being harvested, there are rice and wheat. With a harvester (commonly called "a combine") for harvesting rice or wheat, a harvesting work will proceed such that the harvester will reap stalks with its preprocessing unit while the harvester travels within a field having a predetermined reaping area and will feed these reaped stalks to a threshing unit for threshing and sorting them, after which grains obtained as a result of threshing and sorting will be stored in a grain tank of the harvester. When the grain tank is filled with grains, these grains will be removed therefrom to be loaded onto a transport vehicle such as a truck, which transports the grains to a drying facility for their drying processing. For keeping favorable quality of harvested crops such as grains, it is desired that the crops be dried on the same day as their harvesting. To this end, it is important that the ability of the drying facility for the drying processing be in equilibrium with a harvesting amount of the harvester that harvests the crops to be brought to this drying facility.

From Patent Document 1, there is known a combine equipped with a display monitor for displaying a harvested amount (yield) of grains per unit reaping area calculated by a calculation means based on a detection value from an unhulled rice sensor as a detection means for detecting a stored amount of grains stored in the grain tank during a reaping work-accompanied traveling. With this configuration, a driver can accurately grasp the harvested amount of grains per unit reaping area during a reaping work-accompanied traveling and can also estimate an amount of crops to be harvested in an un-reaped journey. Accordingly, with stopping the work rather than effecting any harvesting work in excess of a drying processing ability of a dryer center, grains stored in the grain tank can be removed therefrom and loaded onto a transport vehicle to be brought into the dryer center to be dried therein. However, such drier center is normally under management of a certain community, which center accepts grains not only from this particular combine, but also from other many combines. Therefore, if the harvesting work by one's own combine is planned based solely on a drying processing ability of the drier center which ability is known in advance, the drying processing may be inadvertently postponed until the next day of brining-in of the crops.

In order to allow a series works from a harvesting work to a drying processing to proceed in an efficient manner, there is known, from Patent Document 2, a combine equipped with a controller configured to obtain the total period from a reaping work to detection of filling of the tank by a grain sensor, as a required period and to output this required period as a control signal to an outputting side transmitter which then transmits the signal to a designated mobile phone. Therefore, a concerned worker standing by can know the initial total work period displayed on the mobile phone in reception of the information from start of reaping work to filling of the storage tank, so that the worker can estimate an approximate period required for the whole harvesting work until completion of harvesting of one-day harvesting target amount. With this, the concerned worker can effect preparation for the next process in timed accordance with the estimated period of completion of harvesting work. In doing this, the driver will start the work after setting the target harvesting amount to be harvested on that day by a target harvesting amount setting dial, thus causing a controller to store this as a set value. In this, this target harvesting amount will be determined based on a rated one-day drying amount of the drying facility. Namely, with this conventional technique too, the harvesting work by the combine of his/her own is planned based solely on the known drying processing ability of the drier center. Therefore, depending on congestion situation of the drier center, there may arise the possibility of the processing therein being postponed until the next day of brining-in of the grains.

From Patent Document 3, there is known a harvested crops management system which includes a transporter vehicle that transfers and transports harvested crops harvested by a harvester, a plurality of processing facilities that carry out processing such as drying of harvested crops transported therein, and information terminals installed in each one of these processing facilities and also in a management center, so as to allow mutual transmission of information via a communication network. According to this system, each processing facility will transmit to the management center, various processing facility information such as the kind of harvested crops processed therein, the processing ability, the acceptable amount, etc. and the transporter vehicle will receive information from the management center and can select a processing facility as the transport destination. Further, this Patent Document 3 discloses also that with transmission of a field location, an amount of harvested crops (or estimated time of full amount) either directly from the harvester to the transporter vehicle or via the management center during a harvesting work, a transporter vehicle can be assigned and sent to the harvester in an efficient manner. However, this Patent Document 3 fails to disclose any solution to the problem of how much a harvester should harvest if an amount of grains harvested on that day can be dried within this same day.

PRIOR ART DOCUMENTS

Patent Documents

Patent Document 1: Japanese Unexamined Patent Application Publication No. 2009-044995 (JP 2009-044995 A) (see FIG. 5)

Patent Document 2: Japanese Unexamined Patent Application Publication No. 2006-094780 (JP 2006-094780 A) (see FIG. 1)

Patent Document 3: Japanese Unexamined Patent Application Publication No. 2008-228630 (JP 2008-228630 A) (see FIG. 2)

SUMMARY OF THE INVENTION

Problem to be Solved by the Invention

In view of the above-described state of the art, in order to allow crops be dried on the same day as their harvesting day, there is a need for a technique according to which the ability of the drying facility for the drying processing may be in equilibrium with a harvesting amount of the harvester that harvests the crops to be brought into this drying facility.

Solution to the Problem

An agricultural crop harvester according to this disclosure comprises a tank in which harvested crops are stored, a stored amount calculation section that calculates a current stored amount of harvested crops stored in the tank, a communication section which receives drier operation information indicative of a drier operational status transmitted from a drying facility, a work management section that determines completion timing of a harvesting work based on the current stored amount and the drier operation information, and a notification section which notifies the completion timing.

With the above-described configuration, it is possible for the agricultural harvester to determine, based on a stored amount of harvested crops stored in its own tank and drier operation information indicative of a current operational status of the drier, at what timing a harvesting work is to be ended if an entire amount of harvested crops brought to a drying facility can be dried within the same day as their harvesting. Therefore, with reporting of the completion timing of the harvesting work based on result of this determination, it becomes possible to achieve equilibrium between the ability of the drying facility for the drying processing and a harvesting amount of the harvester that harvests the crops to be brought into this drying facility.

According to one preferred embodiment of this disclosure, there is provided a drying amount determination section that determines, from the drier operation information, a same-day dryable amount that can be brought in by this harvester to the drying facility to be dried on the same day as this bringing, and the work management section determines the completion timing based on the current stored amount and the same-day dryable amount. With this configuration, the drying amount determination section determines the same-day dryable amount that can be brought in and dried on the same day, from the drier operation information transmitted from the drying facility. And, as the completion timing of harvesting work is determined based on this drying amount and the current stored amount of harvested crops actually stored in the tank, it is possible to harvest an amount of harvested crops that can be dried on the same day, provided the same-day dryable amount that can be brought in and dried on the same day is accurate.

In order to obtain same-day dryable amount that is as accurate as possible, it is important to obtain as recent as possible drier operation information. For this reason, according to one preferred embodiment of the present disclosure, the calculation of the current stored amount and/or the determination of the same-day dryable amount is/are effected in repetition over time; and each time such calculation/determination occurs, the work management section re-calculates the completion timing.

The operation period and operational status of the drier will vary, depending on the moisture content in the harvested crops to be dried. For this reason, in many drying facilities, the drier is operated according to difference of moisture contents. Then, in order to cope with such drying facilities, according to one preferred embodiment of this disclosure, the drier operation information includes drier operational status according to moisture content, and a moisture content calculation section is provided for calculating a moisture content of harvested crops stored in the tank, and the same-day dryable amount is set based on the moisture-content drier operation information and the moisture content of the harvested crops.

A standard agricultural crop harvester is not equipped with a communication section capable of data communication with a computer system provided in a drying facility via a communication network. In such a case, it will be more convenient if a mobile terminal carried by the driver of the crop harvester is utilized as such communication section, rather than providing a dedicated network communication section. Such data communication can be a wired communication such as a USB connection or a wireless communication such as Wi-Fi. To this end, according to one preferred embodiment of this disclosure, the communication section is included in a mobile communication terminal which is connected to a control unit of the agricultural crop harvester to be capable of data exchange therewith. Namely, the communication section of the agricultural crop harvester required for communication with the computer system of the drying facility is substituted for the communication section of the mobile communication terminal.

With a mobile communication terminal such as a tablet computer or a smart phone, a variety of functions can be realized with installment of program applications (simply "applications") thereon. Accordingly, it will be advantageous to implement an arrangement in which at least one of the drying amount determination section, the work management section and the notification section is included in the mobile communication terminal.

Another object of the present disclosure comprises an agricultural crop harvester having a control system that incorporates a function of a mobile communication terminal carried into a cabin of this agricultural crop harvester. Accordingly, when the present disclosure is contemplated from the side of the mobile communication terminal, it is possible to realize those functions essential for this disclosure by a ground work information displaying program to be installed on a mobile communication terminal. Therefore, the scope claimed by the present disclosure is inclusive of an agricultural work management program to be installed on a mobile communication terminal and a recording medium recording such agricultural work management program. For instance, an agricultural work management program to be installed on a mobile communication terminal which is connected to a control unit of an agricultural crop harvester having a tank for storing harvested crops, causes a computer to realize: a stored amount calculation function that calculates a current stored amount of harvested crops stored in the tank, a communication function which receives drier operation information indicative of a drier operational status transmitted from a drying facility, a work management function that determines completion timing of a harvesting work based on the current stored amount and the drier operation information, and a notification function which notifies the completion timing. With the work management program having the above-described configuration, the same functions/effects as the above-described corresponding functional units can be obtained. Further, the same functions/effects can be obtained also with a recording medium recording the inventive agricultural work management program and an inventive agricultural work management method. Incidentally, the recording medium here refers to a non-transient and tangible medium such as a USB memory, an SD card (registered trademark), etc.

Further, as extension of the agricultural work management program and agricultural work management method according to this disclosure, with addition of a drying amount determination function that determines a same-day dryable amount that can be carried into the drying facility to be dried on the same day as the harvesting, it becomes also possible, on the side of the mobile communication terminal, to calculate the completion timing, based on the current stored amount and the same-day dryable amount. Further, it becomes possible to adopt an arrangement wherein the completion timing is notified through the control unit via a notifying device mounted on the agricultural crop harvester. Provided the mobile communication terminal is always "worn" by the driver, it will also be advantageous to notify the completion timing via the notifying device mounted on the mobile communication terminal.

EMBODIMENTS FOR CARRYING OUT THE INVENTION

Before specific embodiments of an agricultural crop harvester according to this disclosure are described, a basic configuration characterizing the present disclosure will be described with reference to FIG. 1.

Figure 1:
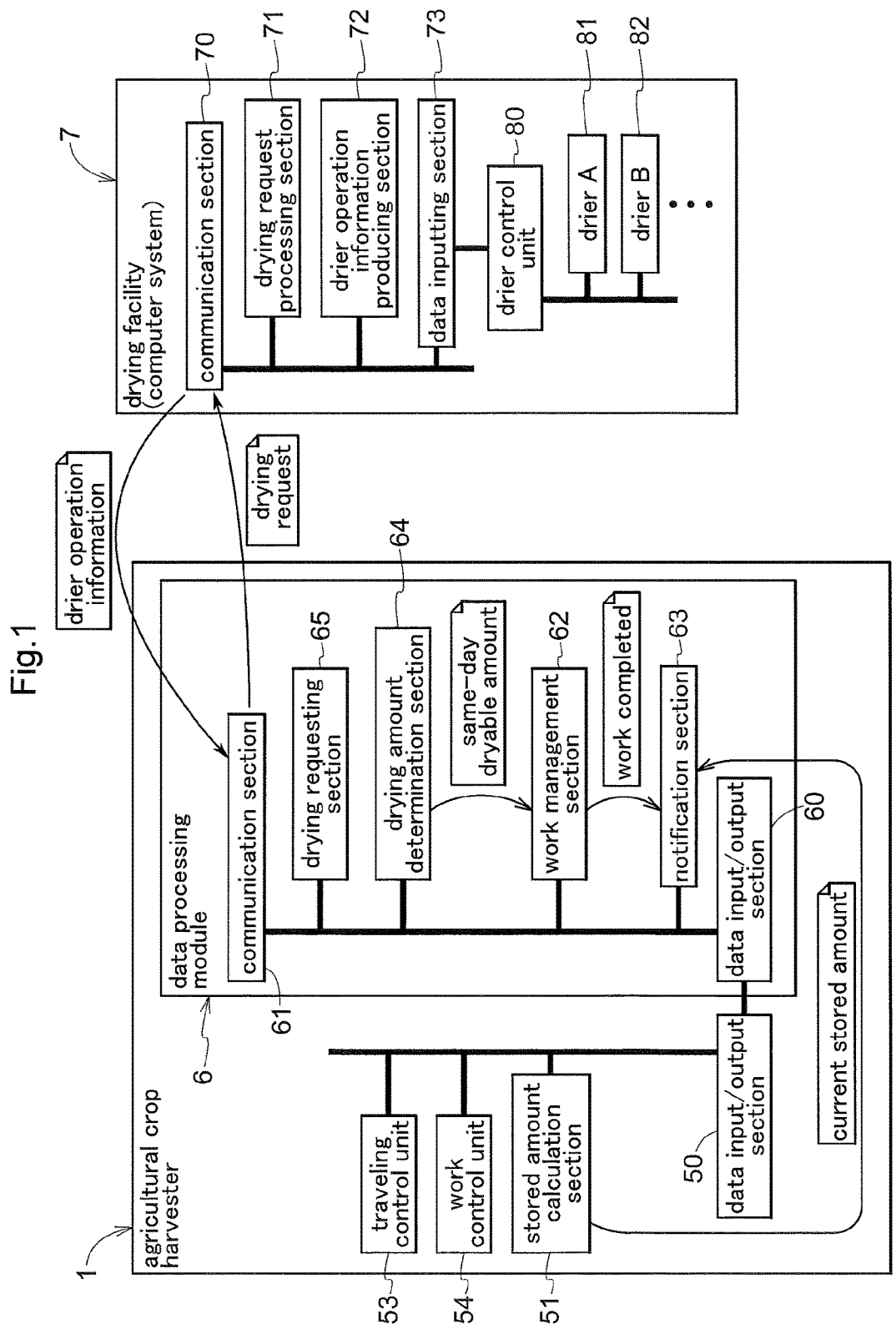
FIG. 1 is a diagram for illustrating a basic configuration of the present disclosure.

As shown in FIG. 1, the agricultural crop harvester (to be referred to simply as "harvester" hereinafter) 1 includes, as a control system thereof, a traveling control unit 53 for controlling traveling of the harvester 1, and a work control unit 54 for controlling a reaping work implement of the harvester 1. Further, as a determination system, there is provided a stored amount calculation section 51 for calculating a current stored amount of harvested crops stored in a tank for storing harvested crops. Moreover, there is provided a data processing module 6 constituting a data processing system. Here, the control system and the determination system are interconnected via a vehicle-mounted LAN, so that the vehicle-mounted LAN and the data processing module 6 are interconnected so as to exchange data therebetween via data input/output sections 50, 60. Needless to say, the control system, the determination system and the data processing module 6 can be interconnected via a same vehicle-mounted LAN instead.

The data processing module 6 includes a communication section 61, a work management section 62, a notification section 63, a drying amount determination section 64 and a drying requesting section 65. The communication section 61 connects the data processing module 6, i.e. the harvester 1, with a computer system of a remotely located drying facility 7, for enabling data exchange therebetween, via a communication network such as a public LAN (Local Area Network), a mobile telephone network, the Internet, or the like. The computer system of the drying facility 7, which will be detailed later, generates drier operation information indicative of operational statuses of a group of driers 81, 82, . . . that are installed in the drying facility 7. When the drying requesting section 65 requests drier operation information from the drying facility 7, the drying facility 7 will transmit the drier operation information to the harvester 1.

The data processing module 6 receives a current stored amount indicative of a currently stored amount calculated by a stored amount calculation section 51 and the drier operation information transmitted from the drying facility 7. Then, based on this current stored amount and the drier operation information, it is possible to determine how much more harvested amount can be increased, that is, completion timing when today's harvesting work by the harvester 1 should be completed, if all the crops harvested on this day are to be dried on this same day. Here, the drying amount determination section 64 determines, based on data read from the drier operation information received, a same-day dryable amount that can be carried into the drying facility 7 by this harvester 1 to be dried on the same day. Further, since operational statuses of the group of driers 81, 82 . . . in the drying facility 7 change moment to moment over time, it is preferred that the calculation of the current stored amount and the determination of the same-day dryable amount be effected in repetition over time. When the determined same-day dryable amount is forwarded to the work management section 62, the work management section 62 determines the completion timing of the harvesting work, based on this same-day dryable amount and the current stored amount transmitted from the stored amount calculation section 51. If the same-day dryable amount still exceeds the current stored amount significantly, the harvesting work will be continued. But, as the difference between the same-day dryable amount and the current stored amount diminishes, the work management section 62 will determine this (now) is the completion timing timing, thus outputting a work stopping command requesting stop of the harvesting work.

Incidentally, for the sake of readiness of explanation, the work management section 62, the drying amount determination section 64, and the drying requesting section 65 have been treated as independent functional sections. However, as these functional sections are to be realized substantially with execution of a program, these can be integrated/combined or further divided if desired.

The notification section 63 has a function of outputting display data to a display and a function of outputting a drive signal to a lamp or a buzzer, in order to notify the driver of information related to completion timing including the work stop command determined by the work management section 62.

The computer system of the drying facility 7 includes a communication section 70, a drying request processing section 71, a drier operation information producing unit 72, and a data inputting section 73. The communication section 70 effects data exchange with the data processing module 6, i.e. the harvester 1, via the communication network. The drying request processing section 71 creates a queue of drying request, based on drying request sent from the harvester 1. The data inputting section 73 inputs operation data of the group of driers 81, 82, . . . from a drier control unit 80 which controls these group of driers 81, 82, . . . in the drying facility 7, and transmits the operation data to a drier operation information producing section 72. The drier operation information producing section 72 reads operational statuses of the drier group 81, 82 . . . , such as the number and drying amounts of drier(s) standing-by and completion time of currently operating drier(s), etc. from the received operation data, and then produces the drier operation information, in consideration also of the queue created by the drying request processing section 71. Regarding this drier operation information, such current drier operation information will be sent to the harvester 1, in response to a request from the drying requesting section 65 of the harvester 1.

With the above-described basic configuration, based on the amount of crops harvested so far and the current operational status of the drying facility, the harvester 1 can determine how much more crops can be harvested if to be dried on this same day in the drying facility 7. Then, by reporting completion timing of harvesting work based on the result of the determination, the driver can carry out a harvesting work as efficiently as possible.

The standard type harvester 1 is not equipped with the communication section 61 capable of data communication with the drying facility 7 via a communication network. In such a case, it is possible to employ a configuration that the data processing module 6 is comprised of a mobile communication terminal such as a personal computer, a tablet, a smart phone or the like, and its data input/output section 60 and the data input/output section 50 of the harvester 1 are interconnected for allowing data transmission therebetween. This connection between the data input/output section 50 and the data input/output section 60 can suitably comprise a wired communication such as a USB connection or a wireless communication such as Wi-Fi.

Figure 2:
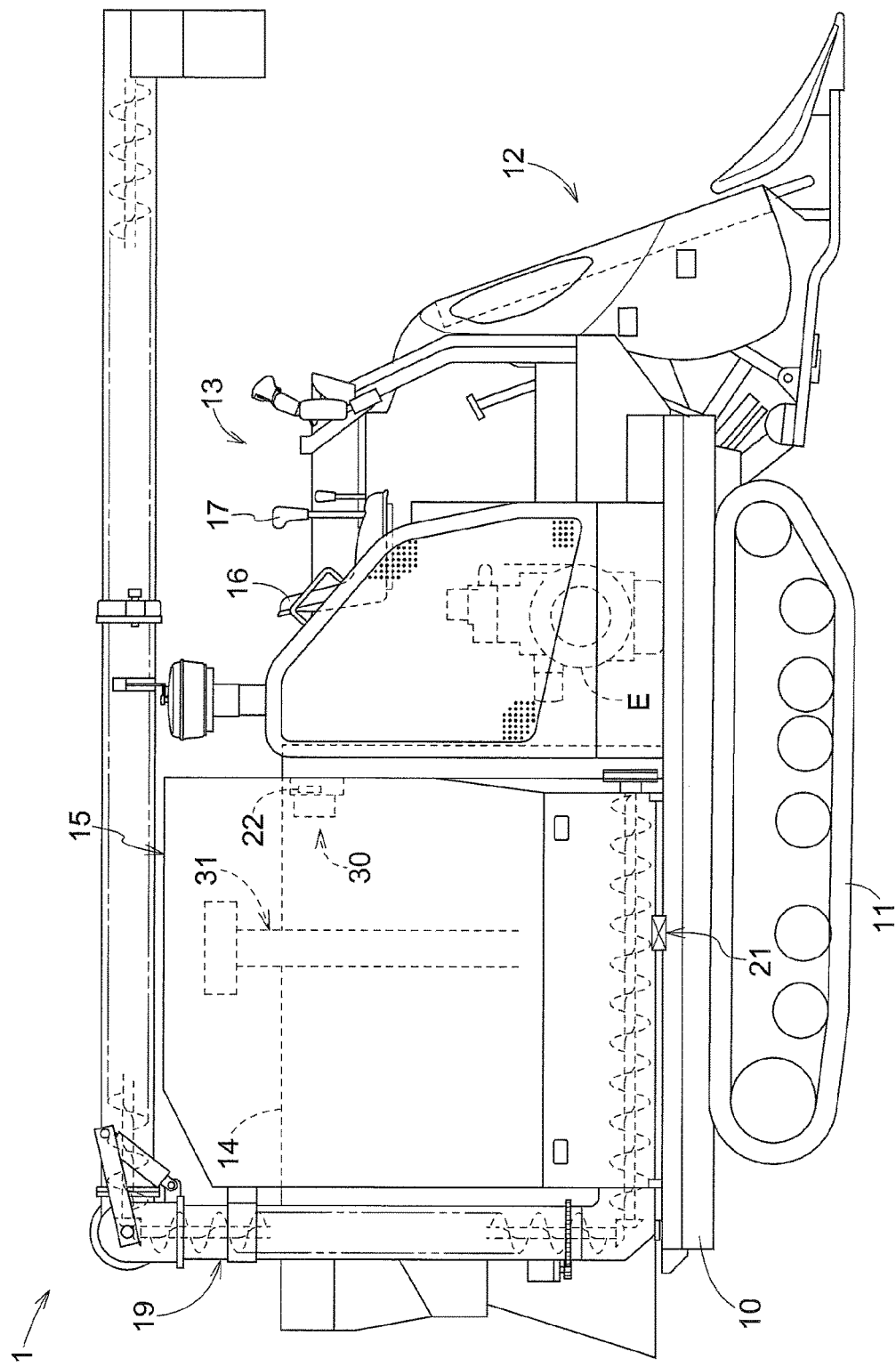
FIG. 2 is a side view of a combine as one specific embodiment of an agricultural crop harvester related to this disclosure.
Figure 3:
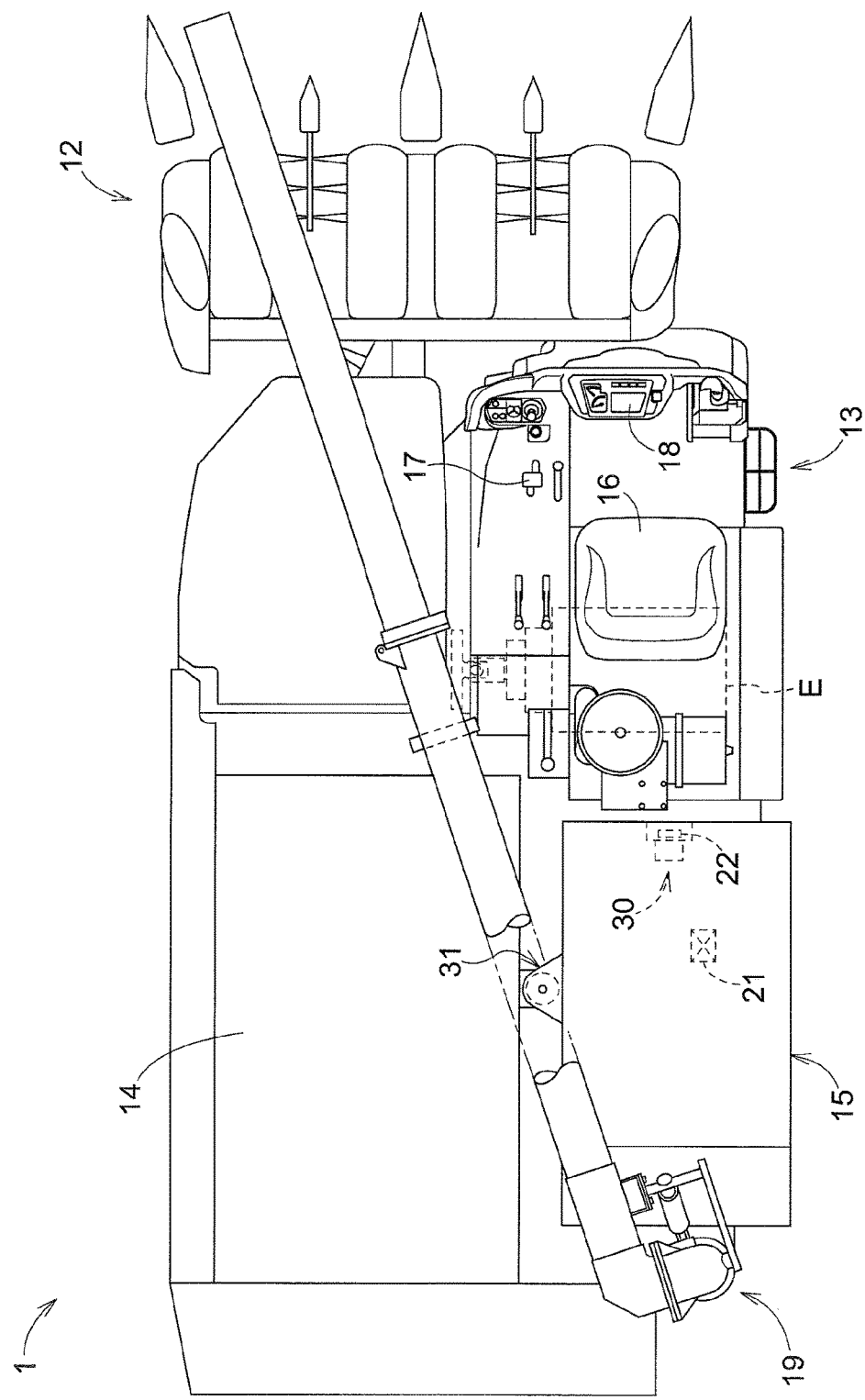
FIG. 3 is a top plan view of the combine.

Next, with reference to the accompanying drawings, there will be described one specific embodiment of the agricultural crop harvester according to this disclosure. Here, the agricultural crop harvester is configured as a crawler type self-threshing type combine (to be referred to simply as "combine" hereinafter). So, its harvested product are grains. FIG. 2 shows a side view of the combine 1 and FIG. 3 shows a top plan view of the combine 1, respectively.

The combine 1 includes a machine frame 10 comprised of a plurality of steel members such as angular pipes connected to each other. Under the machine frame 10, there are mounted a pair or right and left crawlers 11. On the front side in the right half section of the machine frame 10, an engine E is mounted, and upwardly thereof, a driver's section 13 is formed. In the driver's section 13, there are provided a driver's seat 16, a control lever 17, a vehicle-mounted display 18, etc. At the front end portion on the left side of the machine frame 10, there is provided a reaper unit 12 for reaping product stalks to be harvested and conveying the reaped stalks rearwards, while the combine performs a work while traveling. In the left half portion of the machine frame 10, there is mounted a thresher device 14 configured to receive reaped stalks conveyed by the reaper unit 12, effect a threshing operation on grain-bearing portions of the reaped stalks while conveying the reaped stalks rearwards, and further effect a sorting operation on the grains obtained during the threshing operation. On the rear side in the right half portion of the machine frame 10, there is mounted a grain tank 15 formed of plate metal for storing an amount of grains lifted and conveyed via a screw-type lifting feed conveyer 31 from the thresher device 14. The grain tank 15 includes a grain discharging device 19 for discharging grains stored in the grain tank 15 to the outside of the combine. Though shown only schematically in FIG. 3 and FIG. 4, under the grain tank 15, there is provided a stored amount sensor 21 for detecting the weight of grains, and inside the grain tank 15, there is provided a gustatory determination mechanism 30 incorporating a gustatory sensor 22. This gustatory sensor 22 outputs determination data of a moisture value and a protein value of grains as quality data. So, the gustatory sensor 22 can be utilized as a moisture determination sensor for harvested product.

Figure 4:
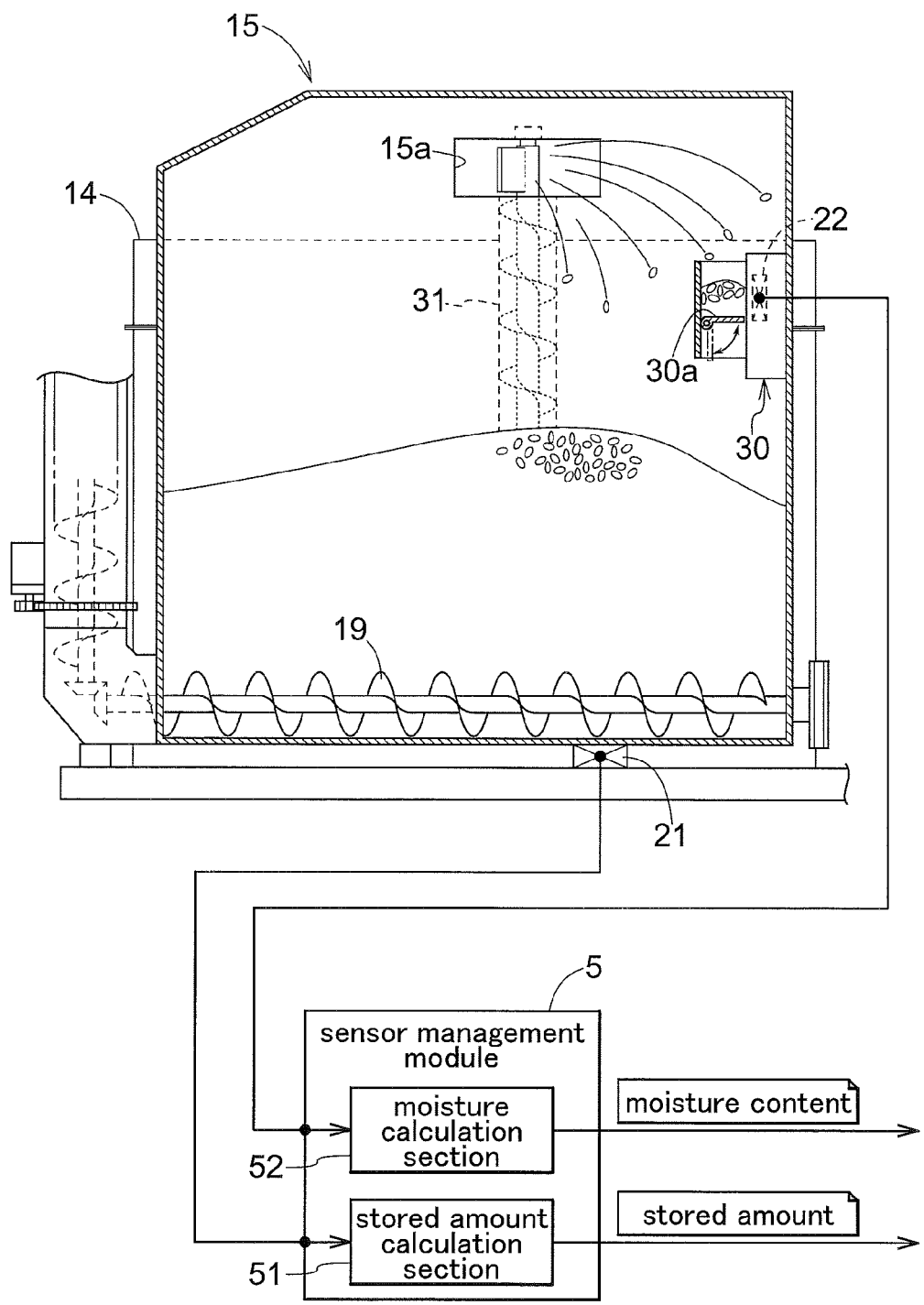
FIG. 4 is a diagram showing layouts of a harvested amount sensor and a gustatory sensor.

As shown schematically in FIG. 4, the stored amount sensor 21 comprises a load cell attached to the machine frame 10, and the grain tank 15 is mounted on the load cell. Namely, the stored amount sensor 21 is configured to determine a stored amount of harvested grains by determining the weight of these grains stored in the grain tank 15, including the weight of the tank 15 per se. By calculating an increase amount by the stored amount sensor 21 for each predetermined sampling timing, a stored amount per unit period can be obtained. In doing so, it is also possible to obtain a stored amount per predetermined unit distance, with consideration to the traveling speed also. In the present embodiment, as schematically shown in FIG. 4, the gustatory sensor 22 is incorporated in the gustatory determination mechanism 30 which is mounted to the lateral wall of the grain tank 15 from the outside. The gustatory determination mechanism 30 includes, inside the grain tank, a determination table 30a which is pivotally opened/closed between a parallel posture and a hung-down posture. The determination table 30a is enclosed in a tubular case having an upper opening and a lower opening. Further, the determination table 30a is disposed at a position which is reached by a portion of grains which are conveyed by the feed conveyer 31 from the thresher device 14 and discharged by a vane wheel through an inlet opening 15a to the grain tank 15. Whereby, the determination table 30a, when it is under the horizontal posture, can receive grains discharged through the inlet opening 15a. When a predetermined amount of grains is placed on the determination table 30a, determination by the gustatory sensor 22 is effected. In this embodiment, there is employed spectroscopic analysis, so that determinations of the moisture value and protein value of the grains are made possible. Further, the moisture value, protein value and gustatory values derived from the ratios thereof can be obtained as determination values. Upon completion of the determination by the gustatory sensor 22, the determination table 30a will be pivoted into the hung-down posture to discharge the grains which have been placed on the determination table 30a. Aft the discharge of grains and when the next determination sampling timing comes, the determination table 30a will be pivoted into the horizontal posture again.

The constituents of the drying facility 7 of this embodiment are substantially identical to those shown in FIG. 1, but the group of driers 81, 82 . . . of the drying facility 7 are configured to be operated according to a moisture content of the harvested products, that is, grains. More particularly, the driers are configured to classify (sort) the grains brought in according to their moisture contents and to carry out drying operations for each class. Therefore, the acceptable amount on a day will differ, depending on the moisture content of grains as harvested products. Therefore, the drier operation information includes drier operational statuses according to moisture contents of grains.

Figure 5:
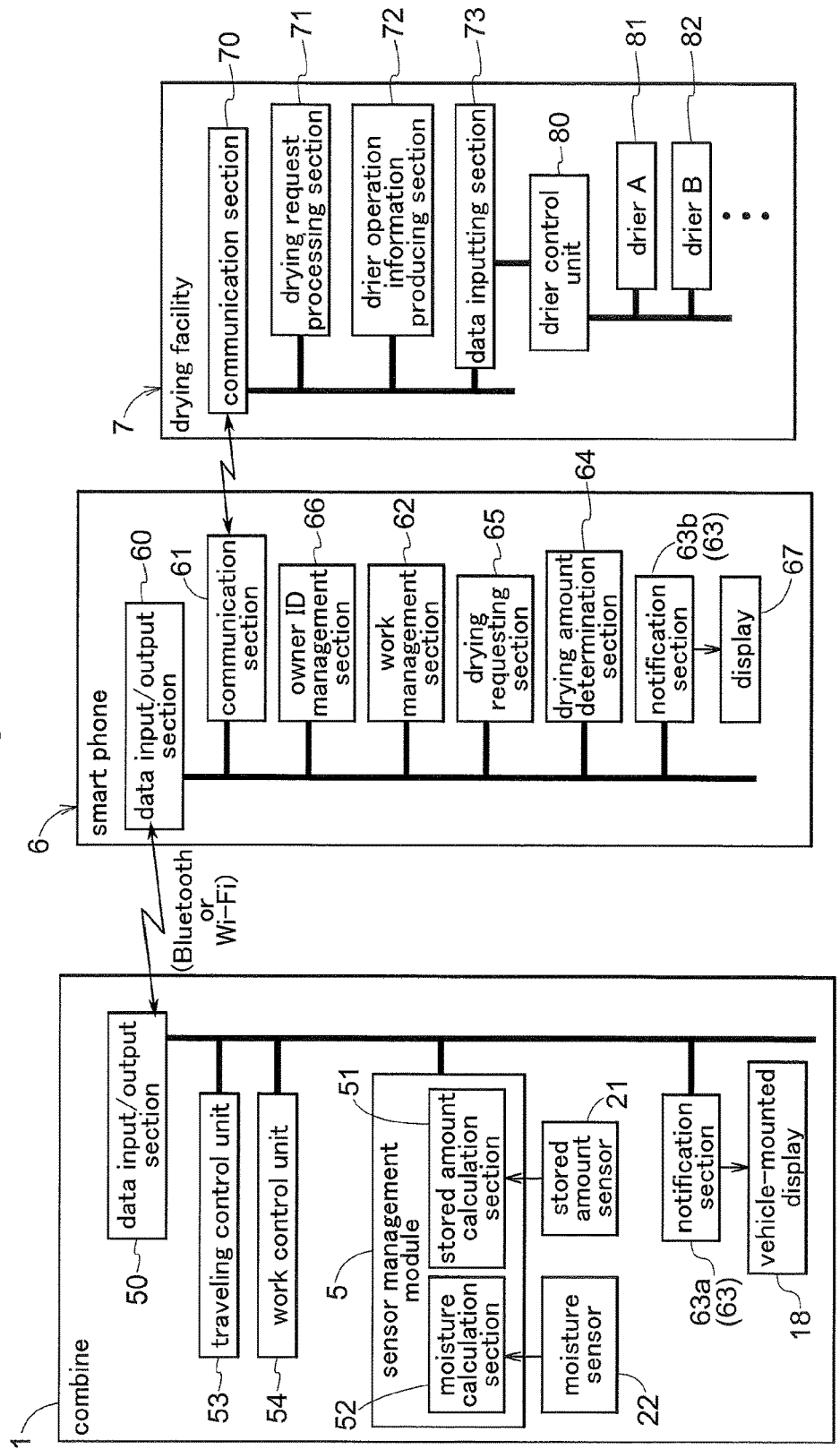
FIG. 5 is a functional block diagram of a control system of the combine and a smart phone incorporated in this combine.

Further, as may be clear from FIG. 5, in this embodiment, the data processing module 6 is comprised of a smart phone as a mobile communication terminal carried by a driver. Next, there will be described a control system of the combine 1 and functional sections in the smart phone which are incorporated in this control system of the combine 1.

The functional units built in the control system on the combine 1 side include the traveling control unit 53, the work control unit 54, the sensor management module 5, the notification section 63a connected to the vehicle-mounted display 18, and the data input/output section 50. The traveling control unit 53 is an ECU (Electric Control Unit) which handles various kinds of control information related to vehicle traveling and handles data such as a traveling speed, an engine speed, a traveling distance and a fuel consumption, which are obtained from the sensor management module 5 via the vehicle-mounted LAN. The work control unit 54 is an ECU which controls reaping implements such as the reaper unit 12 and the threshing device 14, and handles data indicative of operational states and working states of the reaping implements, based on sensor information obtained.

In the sensor management module 5, there are built in, as those relating especially to the present disclosure, the stored amount calculation section 51 which calculates a current stored amount of grains stored in the grain tank 15, based on a determination signal from the stored amount sensor 21, and a moisture calculation section 52 which calculates a moisture amount of grains based on a determination signal from the gustatory sensor 22. Needless to say, the sensor management module 5 has functions for inputting determination signals from various sensors such as the traveling speed sensor and the traveling distance sensor, other than the gustatory sensor 22 usable as a moisture detection sensor described above and the stored amount sensor 22, and forwarding such signals to other functional units (sections).

The data input/output section 50 is a wireless communication section for effecting communication over a relatively short distance in order to exchange data with the smart phone carried by the driver and operates under such protocol as Wi-Fi and Bluetooth (registered trademark).

The work management section 62, the drying amount determination section 64 and the drying requesting section 65, which are described with respect to the basic principle shown in FIG. 1, are configured as applications of the smart phone in this embodiment. For this reason, the work management section 62 receives data indicative of the current stored amount and the moisture content of the stored grains from the stored amount calculation section 51 and the moisture calculation section 52, via the combine-side data input/output section 50 and the smart phone-side input/output section 60. Further, the smart phone is provided originally with an owner ID management section 66, the communication section 61 capable of data communication via a communication network, and the notification section 63b configured to display various kinds of information on the display 67. Therefore, in the instant embodiment, by verifying the driver with utilization of the owner ID management section 66, security can be ensured for the information produced at the combine 1. Moreover, with utilization of the communication section 61, data exchange is possible with a remotely located drying facility 7, without having to provide the combine 1 with any special communication function. Furthermore, with utilization of the notification section 63b of the smart phone, it is possible to display on the display 67, information for notifying the driver of the completion timing of harvesting work determined by the work management section 62. Alternatively, an agricultural work management program for causing a computer to realize a stored amount calculation function for calculating a currently stored amount of grains stored in the grain tank 15, a communication function that receives, via the communication section 61, drier operation information indicative of drier operational status sent from the drying facility 7, a work management function that determines completion timing of harvesting work based on the current stored amount and the drier operation information, a notification function that notifies the completion timing, etc. can be recorded on a recording medium. Then, by mounting the recording medium on the smart phone as the data processing module 6 when needed, such functions can be incorporated in the smart phone.

Figure 6:
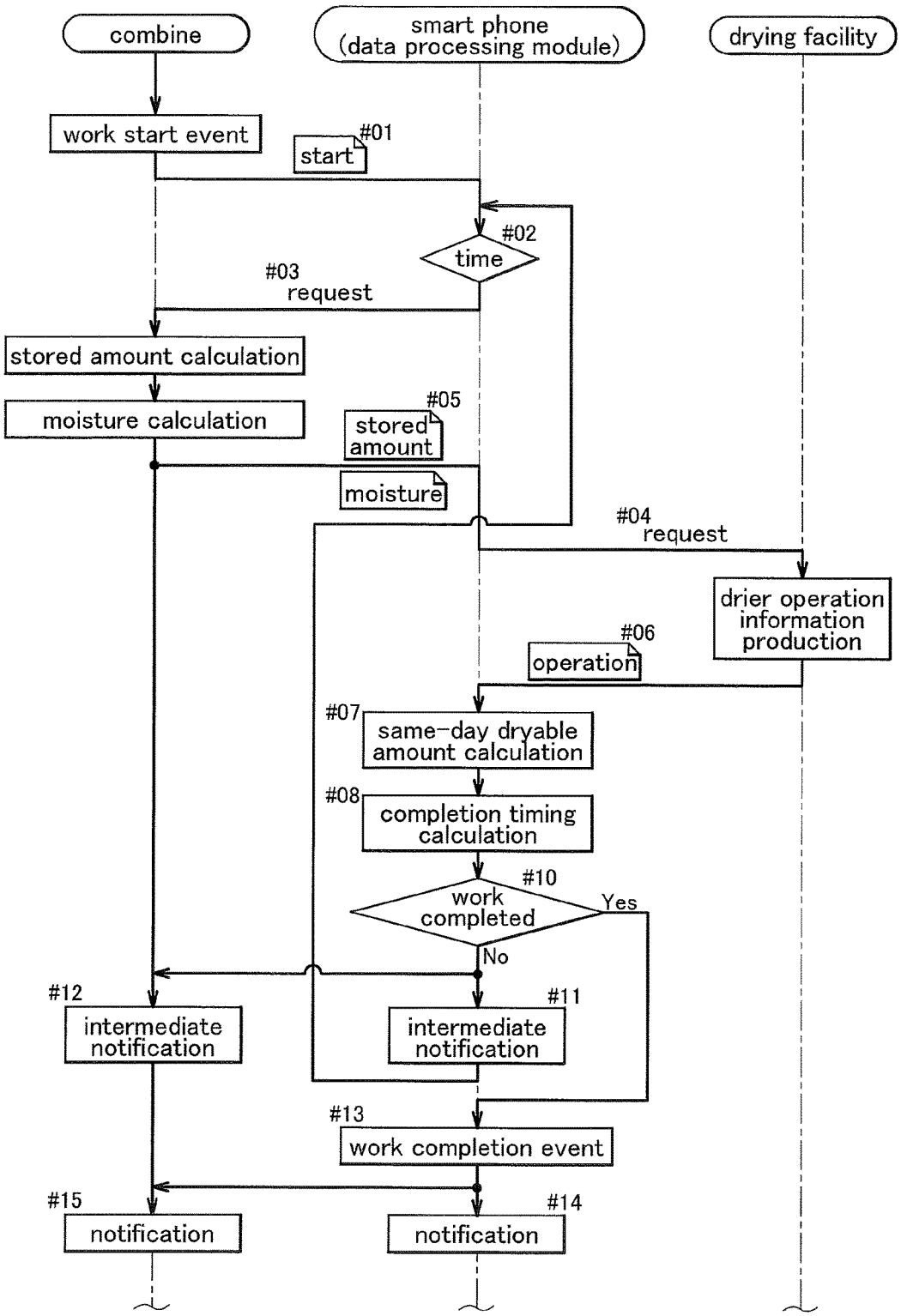
FIG. 6 is a flowchart showing flow of information among the combine, the smart phone incorporated in the combine and a drying facility.

Next, with reference to the flowchart shown in FIG. 6, there will be described an example of flow of information among the combine 1, the smart phone incorporated in this combine 1, and the drying facility 7.

When the combine 1 starts a harvesting work, a work start event is sent from the work control unit 54 to the smart phone (data processing module 6) (#01). Upon receipt of this work start event, the work management section 62, the drying amount determination section 64 and the drying requesting section 65, each comprising a program related to the combine work management in the smart phone, are activated. As the combine work management is effected by a predetermined interval, the process effects a time check (#02). If the time condition is satisfied, the work management section 62 will request data of stored amount and moisture content of grains from the sensor management module 5 of the combine 1 (#03). Further, the drying requesting section 65 will request current drier operation information in order to ask for today's grain drying service from the drier center (computer system) 7 (#04). The sensor management module 5 of the combine 1 returns the data of current stored amount and moisture content to the smart phone (#05). The drier operation information producing unit 72 of the drying facility 7 returns drier operation information including drier operational status according to grain moisture content classes to the smart phone (#06).

The drying amount determination section 64 calculates the same-day dryable amount from the moisture of the harvested grains and the drier operation information (#07). Further, the work management section 62 calculates completion timing of harvesting work, from the current stored amount and the calculated same-day dryable amount (#08). Here, the process will determine whether the calculated completion timing corresponds to the present timing or not, that is, whether the harvesting work should be ended now or not (#10). If there still remains some time until completion of harvesting work, such will be notified as intermediation notification to the display 67 of the smart phone (#11) and also to the vehicle-mounted display 18 of the combine 1 (#12). Thereafter, the process returns to step #02 and stands by for the starting time of the next combine work management.

If it is determined at step #10 that now is the completion timing and completion of harvesting work is determined, then, a work completion event is generated (#13). Upon receipt of this work completion event, the display 67 of the smart phone will display a comment urging completion of the harvesting work (#14). Further, the vehicle-mounted display 18 of the combine 1 will display a flickering display urging completion of harvesting work. Needless to say, as modes of displaying on the smart phone display 67 and the vehicle-mounted display 18, various kinds can be employed. Further, the smart phone can be vibrated so as to call driver's attention, instead of or simultaneously with the displaying on the smart phone display 67.

[Other Embodiments]

(1) In the foregoing embodiment, it was described that a single drying facility 7 is provided. Instead thereof, if a plurality of drying facilities 7 are present, it is possible to implement an arrangement that a best drying facility 7 is selected based on drier operation information sent from such multiple drying facilities 7.

(2) In the foregoing embodiment, it was described that the data processing module 6 is built in the control system of the combine 1 or in the mobile communication terminal such as a smart phone carried by the driver. Instead thereof, the data processing module 6 can be built in a computer system having communication function located at a site distant from the field. In such a case, as the notification section 63, the one included in the combine 1 side will be utilized.

Figure 7:
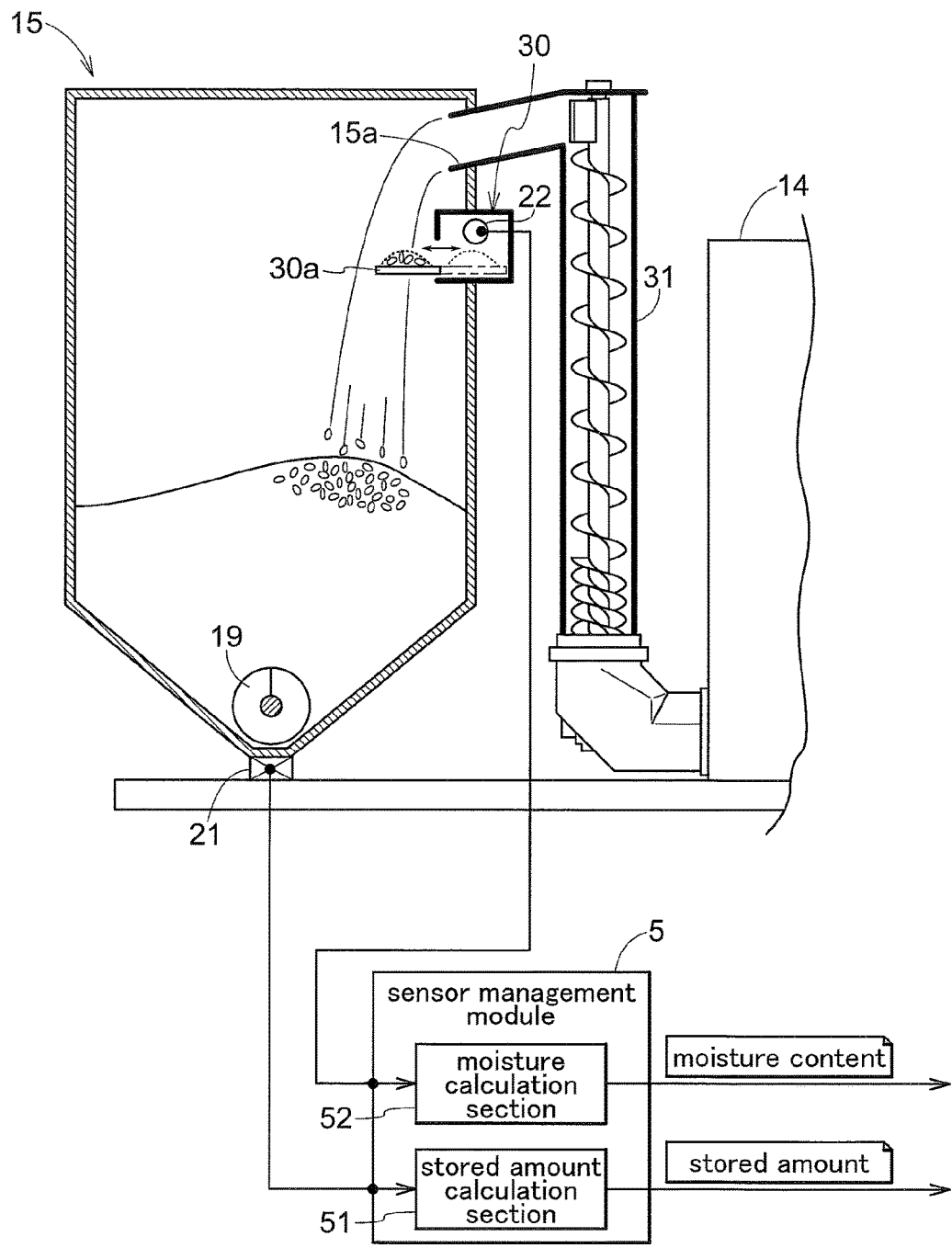
FIG. 7 is a diagram showing a further embodiment of a gustatory determination mechanism.

(3) In the foregoing embodiment, the determination table 30a of the gustatory determination mechanism 30 incorporating the gustatory sensor 22 was configured to be pivotable between a horizontal posture and a hung-down posture. Instead thereof, any other configuration can also be employed. For instance, as schematically shown in FIG. 7, it is possible to employ a configuration of advancing/retracting the determination table 30a to/from a box-like case of the gustatory determination mechanism 30. In this case, the gustatory determination mechanism 30 will be arranged such that the determination table 30a under its extended state can receive grains conveyed by the feed conveyer 31 from the threshing device 14 and discharged from the inlet 15 of the grain tank 15. With this arrangement, when a predetermined amount of grains has been placed on the determination table 30a, the determination table 30a will be retracted into the gustatory determination mechanism 30 to be subjected to determination by the gustatory sensor 22.

Further, the disposing position of the gustatory determination mechanism 30 is not limited to the grain tank 15, but this mechanism can be disposed at any suitable location on a grain conveying path 3 from the threshing device 14 to the grain tank 15. Further, in case a gustatory determination mechanism 30 capable of high speed determination processing is employed, grains in the course of conveyance, in particular, grains in the course of their discharging from the inlet 15a can be subject to determination.

(4) In the foregoing embodiment, the stored amount sensor 21 was configured of a single load cell disposed adjacent the center of the bottom face of the grain tank 15. But, in order to achieve more accurate determination, it is possible to employ a configuration in which load cells are disposed respectively at four corner areas of the bottom face of the grain tank 15.

(5) In the foregoing embodiment, as an agricultural crop harvester, there was employed a grain combine for rice, wheat, corns, etc. However, the invention is not limited thereto, but the present invention is applicable to all harvesters for harvesting agricultural products needing to be dried.

INDUSTRIAL APPLICABILITY

The present disclosure is applicable to an agricultural crop harvester which exchanges information related to drying operation with a drying facility.

DESCRIPTION OF REFERENCE MARKS/NUMERALS

1: agricultural crop harvester (combine)
15: grain tank
21: stored amount sensor (load cell)
22: gustatory sensor
51: stored amount calculation section
52: moisture calculation section
61: communication section
62: work management section
63: notification section
64: drying amount calculation section
65: drying requesting section
7: drying facility (computer system)
71: drying request processing section
72: drier operation information producing unit
80: drier control unit
81, 82; drier

What is claimed is:

1. An agricultural crop harvester comprising:
a tank in which harvested crops are stored;
at least one sensor configured to determine a stored amount of harvested crops stored in the tank and provide stored amount information;
a stored amount calculation section operatively connected to the at least one sensor and configured to calculate a current stored amount of harvested crops stored in the tank based on the stored amount information from the at least one sensor, the current stored amount being determined when the harvester performs a harvesting work while traveling;
a communication section which receives drier operation information indicative of a drier operational status transmitted from a drying facility;
a drying amount determination section that determines, from the drier operation information, a same-day dryable amount that can be brought in by the harvester to the drying facility to be dried on the same day as this bringing;
a work management section that determines completion timing of a harvesting work by comparing the current stored amount with the same-day dryable amount; and
a notification section which notifies the completion timing.

2. The agricultural crop harvester according to claim 1, wherein the calculation of the current stored amount and/or the determination of the same-day dryable amount is/are effected in repetition over time; and each time such calculation/determination occurs, the work management section re-calculates the completion timing.

3. The agricultural crop harvester according to claim 1, wherein the drier operation information includes drier operational status according to moisture content, and a moisture content calculation section is provided for calculating a moisture content of harvested crops stored in the tank; and wherein the same-day dryable amount is set based on the moisture-content drier operation information and the moisture content of the harvested crops.

4. The agricultural crop harvester according to claim 1, wherein the communication section is included in a mobile communication terminal which is connected to a control unit of the agricultural crop harvester to be capable of data exchange therewith.

5. The agricultural crop harvester according to claim 4, wherein at least one of the drying amount determination section, the work management section and the notification section is included in the mobile communication terminal.

6. An agricultural work management program to be installed on a mobile communication terminal which is connected to a control unit of an agricultural crop harvester to be capable of data exchange therewith, the harvester having a tank for storing harvested crops and at least one sensor configured to determine a stored amount of harvested crops stored in the tank and provide stored amount information, wherein the program causes a computer to realize:
a stored amount calculation function that calculates, during a harvesting work while traveling of the harvester, a current stored amount of harvested crops stored in the tank based on the stored amount information from the at least one sensor;
a communication function which receives drier operation information indicative of a drier operational status transmitted from a drying facility;
a drying amount determination function that determines a same-day dryable amount that can be carried into the drying facility to be dried on the same day as a harvest day;
a work management function that determines completion timing of a harvesting work by comparing the current stored amount with the same-day dryable amount; and
a notification function which notifies the completion timing.

7. The agricultural work management program according to claim 6, wherein the completion timing is notified through the control unit via a notifying device mounted on the agricultural crop harvester.

8. The agricultural work management program according to claim 6, wherein the completion timing is notified via a notifying device mounted on the mobile communication terminal.

9. A non-transitory computer-readable recording medium to be connected to a mobile communication terminal which is connected with a control unit of an agricultural crop harvester to be capable of data exchange therewith, the harvester having a tank for storing harvested crops and at least one sensor configured to determine a stored amount of harvested crops stored in the tank and provide stored amount information, wherein the non-transitory computer-readable recording medium records therein a program causing a computer to realize:
a stored amount calculation function that calculates, during a harvesting work while traveling of the harvester, a current stored amount of harvested crops stored in the tank based on the stored amount information from the at least one sensor;
a communication function which receives drier operation information indicative of a drier operational status transmitted from a drying facility;
a drying amount determination function that determines a same-day dryable amount that can be carried into the drying facility to be dried on the same day as a harvest day;
a work management function that determines completion timing of a harvesting work by comparing the current stored amount with the same-day dryable amount; and
a notification function which notifies the completion timing.

10. An agricultural work management method implemented using a mobile communication terminal which is connected with a control unit of an agricultural crop harvester to be capable of data exchange therewith, the harvester having a tank for storing harvested crops and at least one sensor configured to determine a stored amount of harvested crops stored in the tank and provide stored amount information, the method comprising:

receiving, by a sensor management module provided on the control unit of the agricultural crop harvester, the stored amount information from the at least one sensor;
calculating, by the sensor management module and during a harvesting work while traveling of the harvester, a current stored amount of harvested crops stored in the tank based on the stored amount information from the at least one sensor;
receiving, by a data processing module, drier operation information indicative of a drier operational status transmitted from a drying facility;
calculating a moisture content of harvested crops stored in the tank by the data processing module based on a signal from at least one gustatory sensor provided in the tank;
determining, by the data processing module, a same-day dryable amount that can be carried into the drying facility to be dried on the same day as a harvest day based on the drier operation information and the moisture content of the harvested crops;
determining, by the data processing module, completion timing of a harvesting work after comparing the current stored amount with the same-day dryable amount;
notifying the completion timing by a notification section provided on at least one of the mobile communication terminal and the agricultural crop harvester; and
drying the harvested crops at the drying facility based on the drier operation information and the moisture content of the harvested crops,
wherein the data processing module is provided on at least one of a) the mobile communication terminal, b) the control unit of the agricultural crop harvester, and c) a computer system provided outside the agricultural crop harvester and having communication function with the notification section.

* * * * *